Jan. 23, 1962   G. D. WHITTIER   3,017,850
AUTOMATIC THICKNESS INDICATOR FOR ROUGH LUMBER
Filed Nov. 24, 1958   4 Sheets-Sheet 1

INVENTOR.
GORDON D. WHITTIER
BY
ATTORNEY

Jan. 23, 1962  G. D. WHITTIER  3,017,850
AUTOMATIC THICKNESS INDICATOR FOR ROUGH LUMBER
Filed Nov. 24, 1958  4 Sheets-Sheet 4

INVENTOR.
GORDON D. WHITTIER
BY
ATTORNEY

# United States Patent Office 3,017,850
Patented Jan. 23, 1962

3,017,850
AUTOMATIC THICKNESS INDICATOR FOR ROUGH LUMBER
Gordon D. Whittier, Redmond, Oreg., assignor to Whittier Molding Co., Redmond, Oreg., a partnership firm composed of Gordon D. Whittier and Robert D. Whittier
Filed Nov. 24, 1958, Ser. No. 776,044
8 Claims. (Cl. 118—9)

This invention relates to the measuring of the thickness of lumber in lumber mills, and, in particular, to the measuring of the thickness of rough lumber boards before the boards pass to the planer or for further remanufacture. Although rough boards, manufactured by the usual process of sawing, will generally have a constant predetermined thickness throughout their extent, in some instances, due to defects in the lumber or to mis-cutting, a portion of a board will have less thickness than the remainder of the board, and consequently the board in such portion will be thinner than the predetermined and desired thickness for the rough board. Ordinarily portions of reduced thickness in rough boards are not noticed and the boards travel through the mill until the boards have passed through the planer or other machines where degrade could develop whereupon portions which are of less thickness than the predetermined thickness show up as defects and, in most instances, then require the board or portions of the board to be cast aside as a reject. Also besides having thin places on the board, they vary in thickness from one board to another. It is highly advantageous, therefore, to utilize any extra thickness that might develop.

The object of the present invention is to provide practical automatic means for indicating the minimum thickness of each board so the board can be used to the greatest advantage and least waste. Doing this before the board is cut up for remanufacture or is surfaced at the planer, boards which have portions of less thickness than the desired or predetermined thickness can be pulled out or sorted and thus avoid unnecessary waste or costs.

Since portions of reduced thickness are apt to occur at any place along the board and may be due to imperfections or mis-cutting on either face of the board, an important related object of this invention is to provide automatic means for indicating minimum thickness of a board which will indicate the minimum thickness regardless of where the imperfection or mis-cutting appears in the board, thus registering imperfections on both faces of the board.

The portion in which the minimum thickness occurs in a board may not extend entirely across the face of the board and accordingly a further object of the invention is to provide improved means for indicating minimum board thickness which will register when the minimum thickness is confined only to a relatively small area and not necessarily to a portion extending entirely across the face of the board.

In some instances, however, the imperfections in rough boards, which result in the board thickness being slightly less there than in the remainder of the board, cover a very small area, such as knot holes in particular, and these are not sufficient for rejection of the board. An additional object of the invention is to provide means which will not register minimum thickness when such minimum thickness occurs only in such a small area as a knot, but will indicate any minimum thickness occurring in an area of sufficient extent to justify rejection of the finished board after it has passed through the planer or other machines of re-manufacture.

Another object of the machine, if desired by the user, is to exclude a predetermined length on both ends of the board. For example, if there is a thin portion of the board in the last 8″ of a board, it would be more economical to trim this and take the waste than to classify the whole board as a thin board.

A still further object is to provide a thickness indicator for lumber which will automatically adjust itself for lumber of various and varying widths.

The manner in which these objects and other incidental advantages are attained with the present invention, and in the manner in which this automatic thickness indicator is constructed and operated, will be briefly explained and described with reference to the accompanying drawings, wherein:

FIGURES 4 and 5 are fragmentary sections, similar in part to FIGURE 3, but drawn to a larger scale, with portions shown broken away for clarity;

FIGURE 6 is a fragmentary sectional elevation taken from the right of FIGURE 5 and taken on line 6—6 of FIGURE 3 drawn to the same scale as FIGURE 5;

FIGURE 7 is a fragmentary plan view of the portion shown in FIGURE 5;

FIGURE 8 is a wiring diagram with minor details and relays omitted;

FIGURE 9 is a fragmentary enlarged plan view of the carriage control bar of FIGURE 1; and FIGURE 10 is a fragmentary sectional elevation, partly diagrammatic, of the nozzle assembly.

Figure 1:
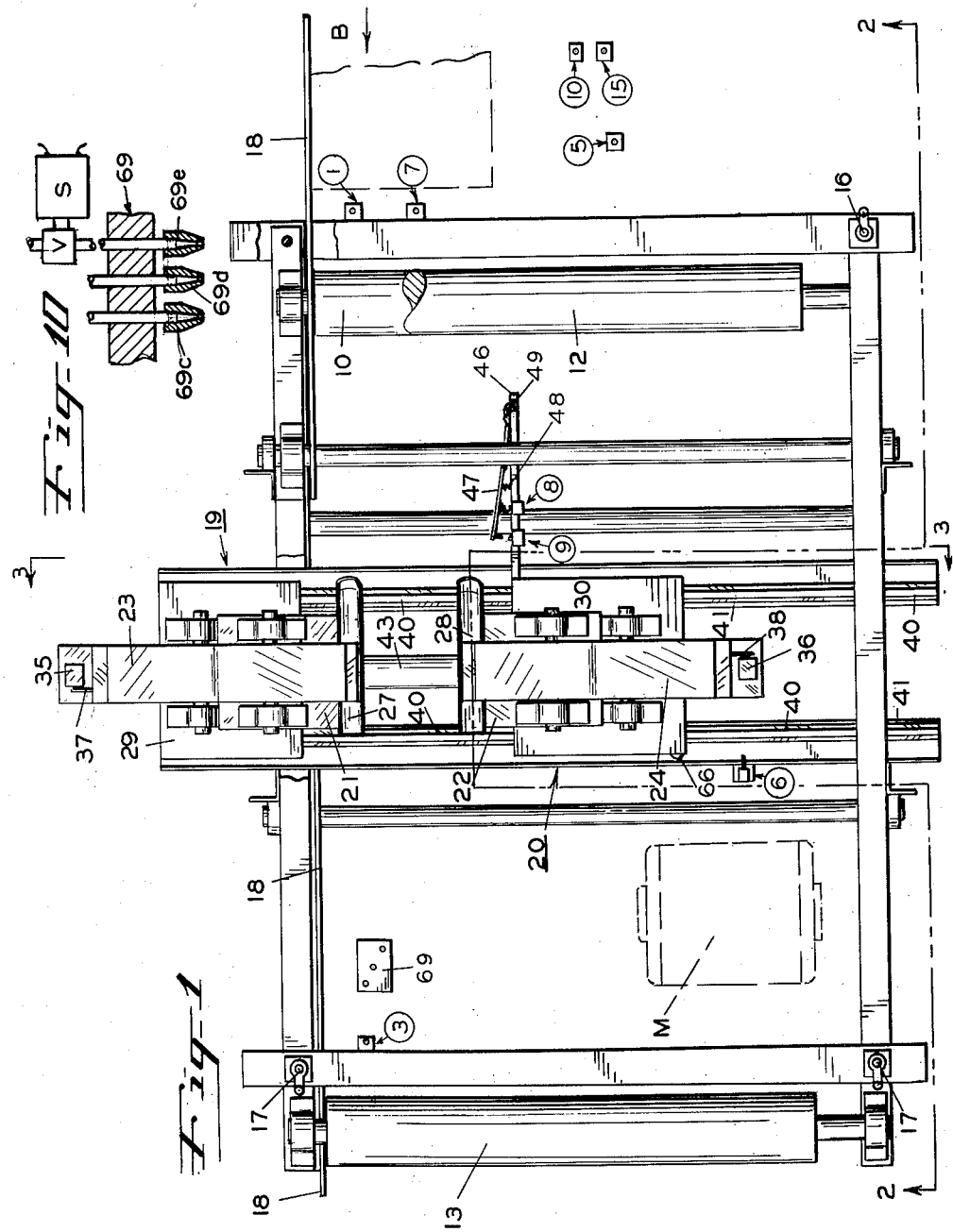
FIGURE 1 is a top plan view of the device, partly diagrammatic, with some minor details omitted for simplicity and clarity.
Figure 2:
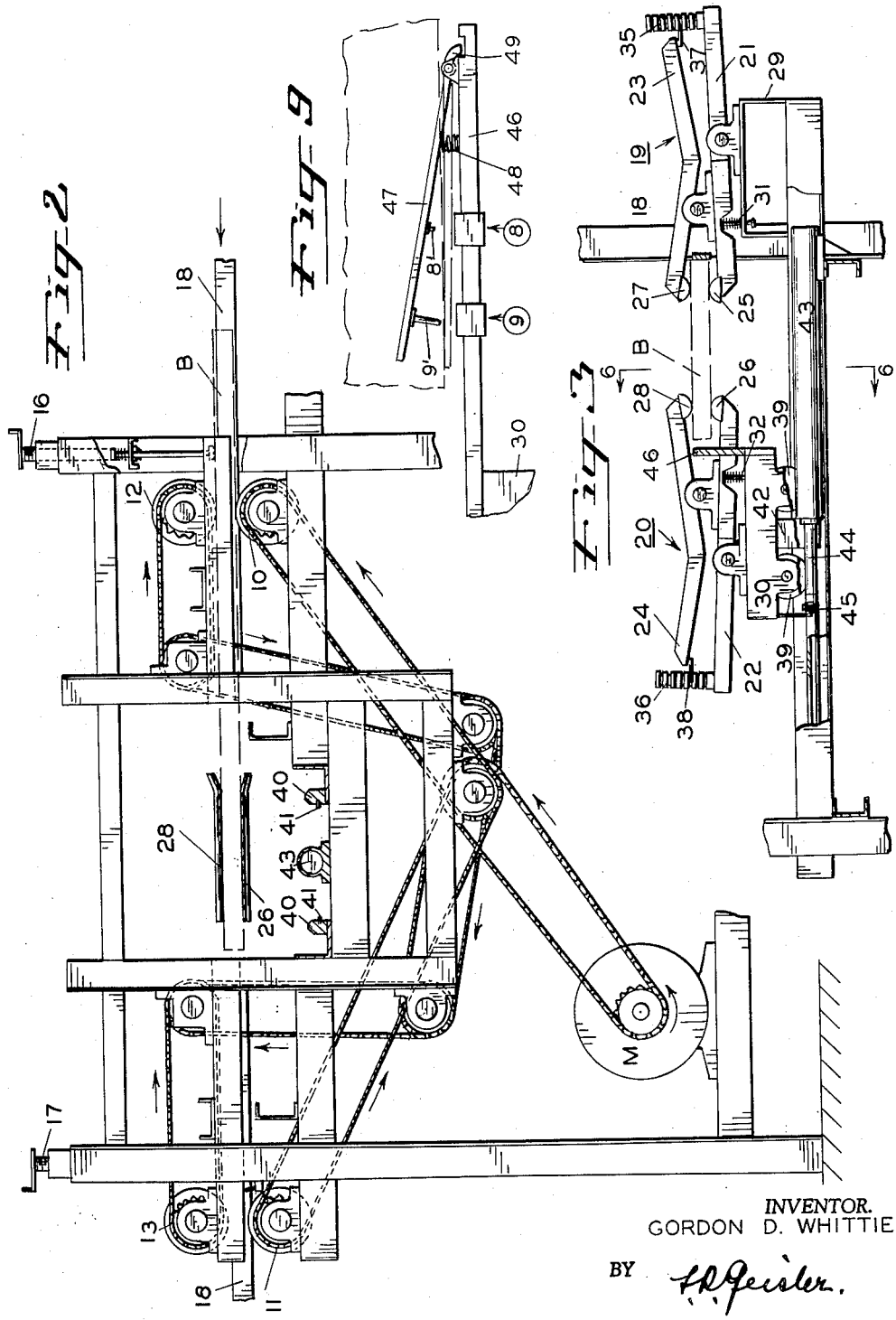
FIGURE 2 is a sectional side elevation taken on line 2—2 of FIGURE 1 but drawn to a slightly smaller scale.

Referring first to FIGURE 1, the board, the minimum thickness of which is to be determined, is indicated in part by the broken lines B, and the board moves from right to left through the device along a stationary side guide 18. The board is moved through the device by lower feed rolls 10 and 11 (shown in FIGURE 2) and corresponding upper feed rolls 12 and 13. These rolls are driven at uniform speed from a motor M by suitable sprocket and chain connections as indicated in FIGURE 2. The upper feed rolls are supported in bearings which are adjustable up and down by suitable means, such as the adjusting screws indicated at 16 and 17 in FIGURE 2, so that the spacing between the lower and upper rolls can be adjusted when necessary.

As the board moves through the device it passes through two oppositely-positioned thickness-measuring assemblies 19 and 20 which engage the top and bottom faces of the board a short distance in from both lateral edges of the board. One of these measuring assemblies 19 is mounted in fixed location with respect to the side guide 18 and thus with respect to the edge of the board adjacent this guide 18. The other measuring assembly 20 is movable towards or away from the measuring assembly 19, by means to be described later, so as to accommodate boards of different or varying widths. In other respects the two assemblies are identical.

Figure 3:
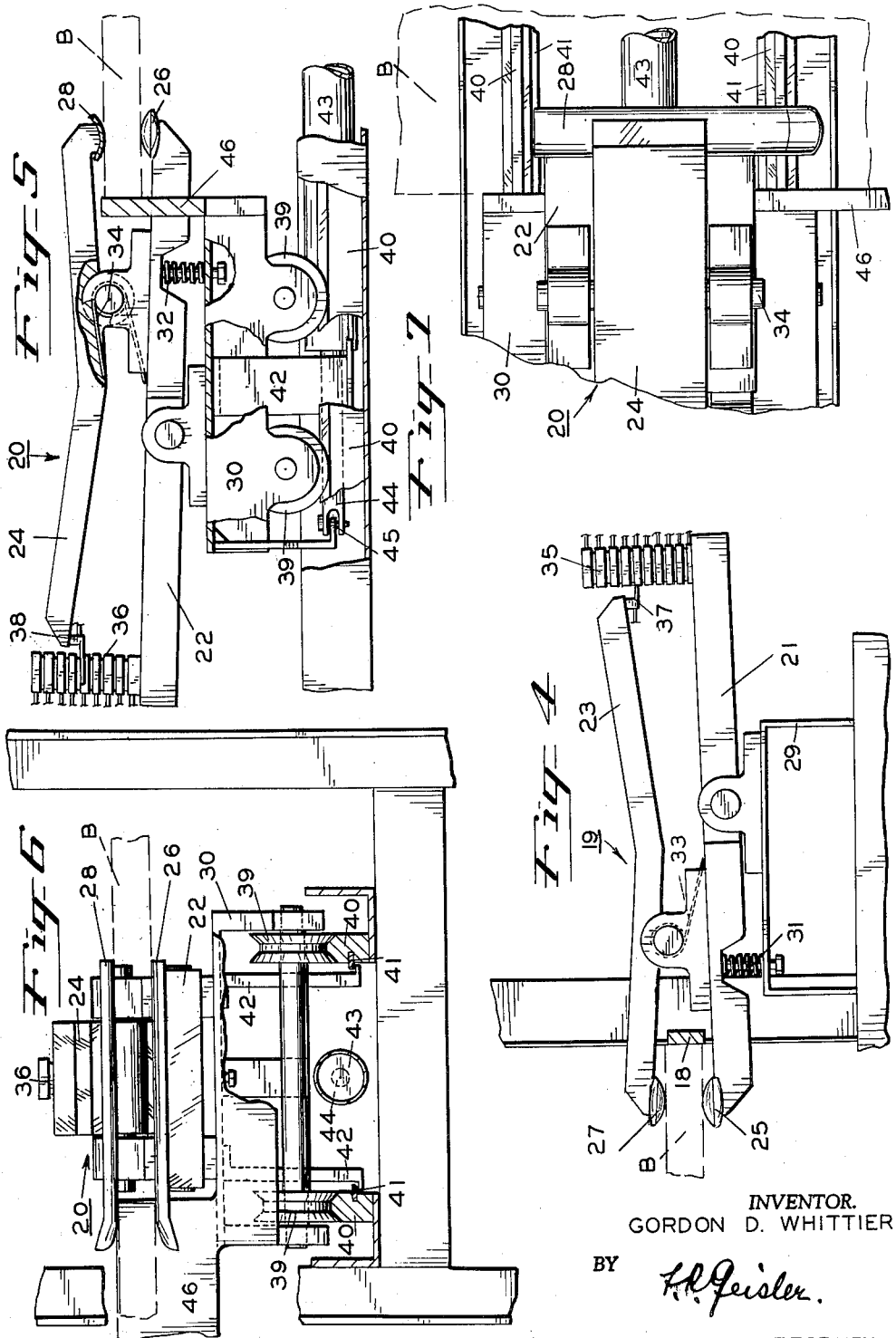
FIGURE 3 is a fragmentary section on line 3—3 of FIGURE 1 drawn to a larger scale.
Figure 4:
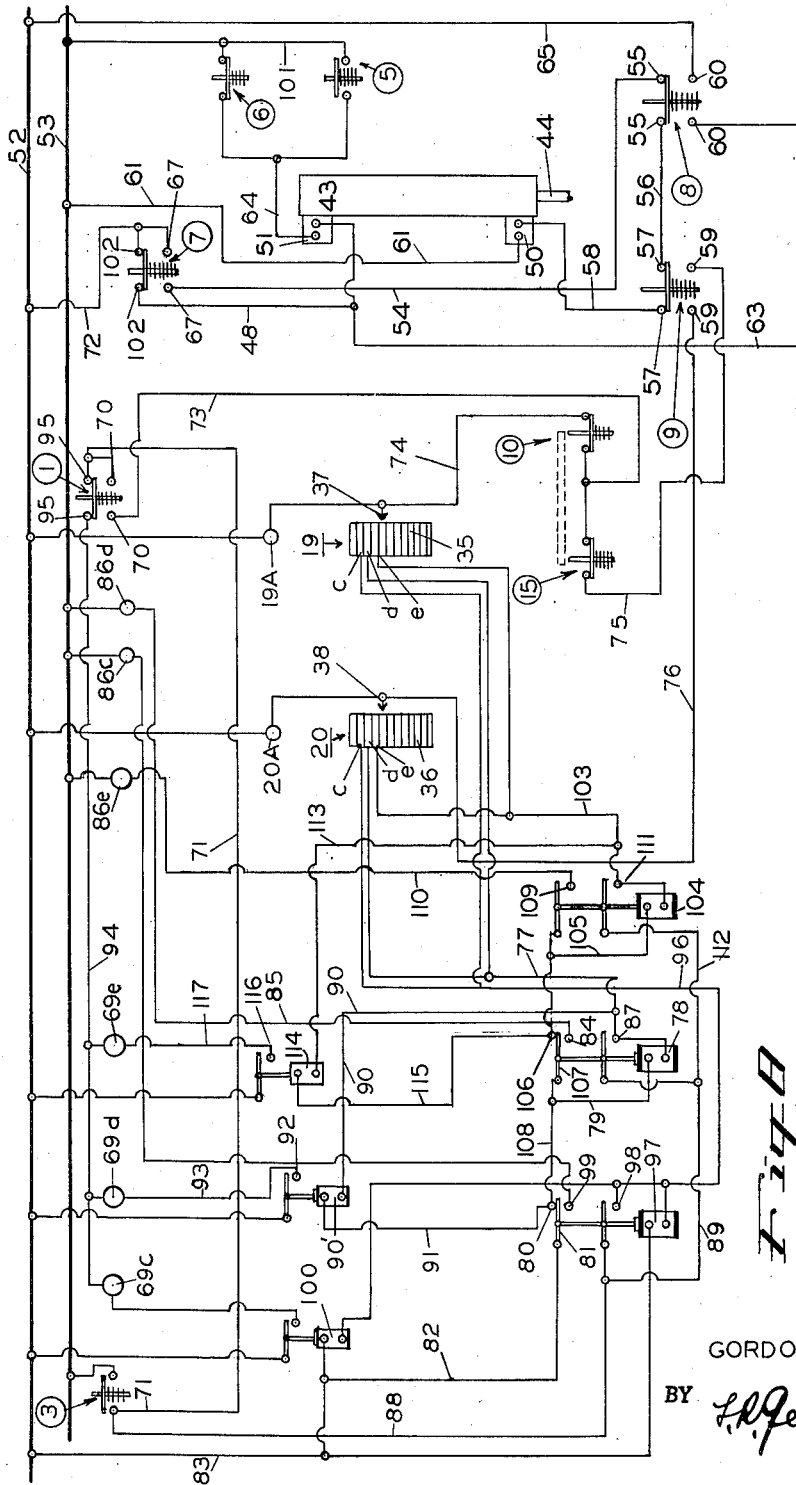

These two measuring assemblies are shown in side elevation in FIGURE 3 with the board (indicated in broken lines at B) passing between them, and are shown separately in FIGURES 4 and 5 respectively. These identical assemblies consist of lower members 21 and 22 respectively, which are hingedly mounted on bases to swing up and down in a vertical plane, and upper members 23 and 24 respectively which are hingedly mounted on the respective lower members and movable up and down in the same vertical plane. Each lower member supports a board-engaging element 25 and 26 respectively on its top face, adapted to be held in engagement with the bottom face of the board B. Each upper member supports a similar board-engaging element 27 and 28 respectively on its under side adapted to be held in engagement with the top face of the board B. Preferably these engaging elements 25, 26, 27 and 28 comprise metal shoes, shaped as shown best in FIGURES 5 and 6, adapted to be slidingly engaged by the faces of the board and to remain in contact with the faces of the board during the passage of the board between the pairs of engaging shoes. However, other forms of engaging elements covering the same area as the shoes, such as narrow rollers with their shafts perpendicular to the line of travel of the board, might be substituted in place of the shoes which are illustrated. The particular shoes as shown are considered as the preferred engaging elements because of the simplicity of construction and because they have proved satisfactory under prolonged operation. They consist of metal bars shaped as shown, their ends being curved to facilitate passage of the board, and they are approximately 5½ inches in length.

The lower members 21 and 22 of the measuring assemblies 19 and 20 are hingedly mounted on their respective bases 29 and 30 preferably near their center points, and coil springs 31 and 32 respectively urge the shoe-carrying ends upwardly to a limited extent, the purpose of these springs, as apparent, being to keep the lower shoes 25 and 26 respectively in contact with the lower face of the board during the travel of the board past the shoes, regardless of irregularities in the lower face of the board.

The upper members 23 and 24 of the measuring assemblies 19 and 20 are hingedly mounted on their respective lower members nearer their shoe-carrying ends, and springs 33 and 34 (FIGURES 4 and 5) urge the shoe-carrying ends of these upper members downwardly, thus urging the pair of shoes together in each measuring assembly. The purpose of this mounting similarly is to keep the upper shoes 27 and 28 in constant contact with the upper face of the board while the board is passing through the measuring assemblies, regardless of any irregularities in the upper face of the board. Thus the upper and lower members of the measuring assemblies cooperate constantly in keeping both faces of the board engaged by the shoes, and the assemblies are sufficiently flexible and adjustable to insure that the two pairs of shoes will maintain constant contact with the board at their corresponding locations during the travel of the board through the measuring assemblies, while the spacing between the upper and lower shoes in each assembly at any moment will correspond exactly to the minimum thickness of the board at the locality of the shoes.

At the ends of the lower members 21 and 22, opposite from the shoes 25 and 26, groups of identical separate electrical segments 35 and 36 respectively are securely mounted. Each segment is insulated from each other segment and each segment is connected to a separate relay circuit. The corresponding ends of the upper members 23 and 24 carry contact pointers 37 and 38 respectively which slide over the segments and which are connected to a suitable power source so as to complete a circuit through each segment when contacting that segment. As the pair of shoes in each measuring assembly are moved towards or away from each other the contact pointer of the assembly will move up or down over the corresponding group of segments. Consequently when a board is passing through these assemblies the highest segment reached by the contact pointers in each assembly will indicate the thinnest portion of the wood contacted by the shoes in that assembly, and, since the pair of shoes contact the board constantly along both edges, there is very little likelihood of any portion of minimum thickness of the board not being encountered by the pairs of shoes. The size of the shoes is such that any portion of reduced thickness of sufficient area to constitute a defect in the board, when contacted by a shoe, will be reflected in the position of the conductor pointer for the measuring assembly, but, on the other hand, such small portions as knot holes, which would not be regarded as sufficient to cause a rejection of the board, will not influence the thickness indicator since they are too small to affect the position of the shoes.

From FIGURES 3, 4 and 5 it will be noted that the hinged mounting of the upper members 23 and 24 is considerably nearer the shoe end than the conductor pointer end of the members. Preferably the hinged mounting is at least twice as far from the conductor pointer end as from the shoe end. The obvious reason for this is to cause greater movement of the conductor pointer end over the segments in comparison with the variations in the spacing between the upper and lower shoes. In this way, by having a considerable number of segments, and having the segments relatively thin, it is possible to detect very slight variations in board thickness by the shifting of the contact pointers.

As previously mentioned with reference to FIGURES 1 and 3, the measuring assembly 19 is mounted in stationary position on a base 29, but the measuring assembly 20 is movably mounted on a carriage 30 which is so arranged that the entire measuring assembly 20 may be moved towards or away from the measuring assembly 19 so as to accommodate boards of different width. Referring now to FIGURES 5 and 6, the carriage 30 is mounted on wheels 39 which roll on stationary tracks 40. The tracks 40 are provided with additional inner safety rails 41 arranged to cooperate with downwardly-extending, L-shaped bars 42 secured on the inside of the carriage 30 so as to prevent any possible inadvertent lifting of the carriage from the tracks.

The movement of the carriage 30 on the tracks 40 is produced by means of an air cylinder and piston operated automatically through certain electrical controls as later described. An air cylinder 43 is firmly mounted in horizontal position in the frame of the device (FIGURE 3) and is supplied with compressed air from a suitable source which may be delivered into either end of the cylinder through solenoid-operated valves of well-known construction, the cylinder also being supplied with suitable exhaust valves (not shown). A piston in the air cylinder has a piston rod 44, the outer end of which is joined by suitable connection 45 (FIGURE 5) to the carriage 30. Thus movement of the air piston produces movement of the carriage 30 and consequently movement of the entire measuring assembly 20 towards or away from the stationary measuring assembly 19.

Referring now to FIGURES 1, 6 and 9, a guide frame 46 is securely mounted on the carriage 30 and extends from one side thereof. This guide frame supports a spring-actuated, hinged control bar 47. The control bar 47 is so positioned as to be in the same horizontal plane as the board passing through the device and is adapted to be engaged by the edge of the board and pushed (counter-clockwise as viewed in FIGURE 9) against the force of its spring 48. The control bar 47 is normally held by its spring 48 (FIGURE 9) in the maximum out position permitted by an end stop 49, but will be moved inwardly against the force of spring 48 when it is encountered by the edge of a board. The guide frame 46 carries a pair of switches 8 and 9 (FIGURES 1 and 9) adapted to be actuated when contacted by operating elements 8' and 9' respectively carried on the control bar 47. When a board enters the device, provided the board is wide enough to make use of the two measuring assemblies in determining minimum thickness (for example, if the board is not less than six inches wide), the passage of the board to the feed rollers causes the board to press down a switch element and operate switch 7 (FIGURES 1 and 8). The operating of this switch actuates a solenoid-operated valve 50 on the cylinder 43 causing air to be delivered into the left end of the cylinder (as viewed in FIGURE 3) and moving the piston, carriage 30 and measuring assembly 20 towards stationary assembly 19 and towards the edge of the approaching board. This movement of carriage 30 continues until the edge of the board contacts the control bar 47 (FIGURE 9) and moves it sufficiently to cause switch 9 to be operated. This stops further movement of the carriage 30 and the measuring assembly 20 remains in this position with its shoes 26 and 28 in contact with the faces of the board while the board passes through the device.

Should the board B have a portion of greater width than that for which the carriage 30 and measuring assembly 20 have been positioned as above described then the additional inward movement imparted to the control bar 47 will also cause the switch 8 to be operated. This will result in air being delivered into the opposite end of cylinder 43 through a solenoid-operated valve 51 (FIGURE 8) which will start the carriage 30 and measuring assembly 20 to back away from the board until the spring-actuated switch 8 returns to normal position (while switch 9 is still engaged). This stops the travel of the carriage and assembly from moving further away from the board. If the board has a subsequent narrower portion sufficient to cause switch 9 to return to normal position, the carriage 30 and measuring assembly 20 will start moving towards the board again. In this way the control bar 47 and the two switches 9 and 8, together with switch 7, keep the carriage 30 and measuring assembly 20 properly positioned for the particular board passing through the device and allow for irregularities in the width of the board. After the board has passed through the device and switch 7 is released up it actuates the solenoid-operated valve 51 on the cylinder 43 causing air to be delivered into the right end of the cylinder and moving the piston, carriage 30 and measuring assembly 20 away from stationary assembly 19. They will continue moving until such movement is stopped by adjustable limit switch 6. Limit switch 6 has a spring-controlled arm which is adapted to be engaged by an element 66 (FIGURE 1) mounted on carriage 30. The purpose of this switch is to keep the carriage and measuring assembly from opening to extreme width of the machine for every board.

Referring now briefly to a portion of the wiring diagram of FIGURE 8, in which 52 and 53 are main conductors from a suitable source of electric power, as a board pushes down switch 7 this will cause current to pass from main conductor 52 over line 72, closed contacts 67, over line 54, closed contacts 55 (normally connected by switch 8), line 56, closed contacts 57 (connected by switch 9 in normal position), and line 58 to solenoid valve 50, which is connected with main conductor 53 by line 61. The resulting movement of the piston (inwardly in cylinder 43) and of the carriage 30 continues until the operation of switch 9 opens the contacts 57.

In the event a wider portion of the board causes the control bar 47 to be moved still further to operate switch 8 to open the contacts 55 and close the contacts 60, then current will pass from main conductor 52, line 65, closed contacts 60, and line 63 to solenoid-operated valve 51, which is connected with main conductor 53 through line 64 and normally closed switch 6. This actuation of valve 51 will cause the carriage 30 to start to move away from the board until switch 8 returns to normal position and opens the contacts 60.

The switch 7 (FIGURE 1) is so positioned that it will be operated by any board having a width of, for example, six inches or more, but will not be operated by boards narrower than six inches since with such narrow boards the gauging of the thickness can be done sufficiently with the single pair of shoes of measuring assembly 19 and consequently the other measuring assembly 20 is not needed for such boards.

A switch 5 (FIGURES 1 and 8) is positioned some distance ahead of the first feed rolls and is so arranged that an excessively wide board will engage switch 5 and close it while passing over the switch. The closing of switch 5 by-passes switch 6 which will cause the carriage 30 to back away from the path of the board and open to the extreme width of the machine. Thus the closing of switch 5 (FIGURE 8) causes current to pass from main conductor 52 through line 72, closed contacts 102 (switch 7) and line 48 to solenoid valve 51, then through line 64, through the closed contacts of switch 5 and line 101 to main conductor 53. The operation of switch 7 then causes the carriage and measuring assembly 20 to move into proper gauging position in the manner already described.

During the passage of a board through the device the contact pointers 37 and 38 of the measuring assemblies 19 and 20 will complete circuits through the segments in the groups 35 and 36 respectively which they contact. Since the highest segment contacted during the travel of the board past the measuring assemblies will indicate the minimum thickness in any portion of the board engaged by the shoes, the circuits are so arranged that the circuit through the highest segment will be held and the other circuits broken and the marking on the board will be produced by the marking means operated by the circuit of the highest segment as the board leaves the device. The particular mark-means preferably employed consists of an assembly of spray nozzles, indicated in part at 69 in FIGURES 1 and 10, each nozzle connected to a supply (not shown) of liquid pigment under pressure and controlled by a solenoid valve connected into the circuit of a particular segment, there being as many colors or combinations of colors as there are individual segments, so that the minimum thickness of the board will be indicated by the corresponding color marking near the end of the board.

As the board is fed into the device it pushes down a switch 1 (FIGURES 1 and 8), in addition to the switch 7 previously described, and when the forward end of the board reaches the switch 3 beyond the measuring assemblies this switch is also closed by the board. As soon as switches 1 and 3 are both closed the device starts gauging. The gauging ceases when switch 1 is released by the board and the marking of the board takes place during the ensuing moment while switch 3 is still being held down by the board. When switch 3 is released the circuits are cleared for the next board. No gauging takes place at the front end of the board until switch 3 is engaged. The gauging stops when switch 1 is released and thus no gauging takes place at the rear end of the board. The variable distance that switch 1 and switch 3 are placed from the gauging shoes determines the desired length on either end of the board that is not to be gauged. At the same time that switch 1 is released switch 7 is released which opens contacts 67 and closes contacts 102 causing current to pass through line 48, actuating solenoid valve 51. This causes carriage 30 and measuring assembly 20 to be backed off until stopped by limit switch 6. This is the normal position of the carriage 30 and measuring assembly 20 when no boards are passing through the machine.

The manner in which the gauging and marking circuits are operated will now be described briefly with reference to the wiring diagram in FIGURE 8. For simplicity the circuits of three of the contact segments in the groups 35 and 36 are shown, but each segment has its own circuit, as previously mentioned, the number of segments and corresponding circuits being optional, and the circuits are all similarly arranged. For purpose illustration it is assumed that the conductor pointers 37 and 38 of the measuring assemblies 19 and 20 contact segments in both groups of segments during most of the travel of the board through the device, but at one portion of the board the pointers move up to the segment C in each group, which is the maximum height they reach during the travel of that particular board through the device, thus indicating the thinnest portion of the board for both assemblies.

With switch 1 pressed down, closing contacts 70, and switch 3 closed, current from main conductor 53 passes through switch 3, line 71, closed contacts 70, line 73, foot control switch 10 (normally closed and mentioned later), and line 74 to conductor pointer 37 of assembly 19; and also through foot control switch 15 (normally closed and mentioned later), line 75, closed contacts 59 (closed by the operation of switch 9 on control bar 47 as previously described), and line 76 to conductor pointer 38 of assembly 20. Some of the current is diverted from lines 74 and 76 to pass through indicator lights 19A and 20A respectively, which lights indicate to the operator that both measuring assemblies are in condition for gauging.

First let it be assumed that the conductor pointer 37 or 38 contacts segment *e* in the respective assembly, which causes current to pass over line 103 to one terminal of solenoid 104, the other terminal being connected through the line 105, contact 106, switch element 107, over line 108, contact 80, switch element 81, line 82 and line 83 to main conductor 52. The resulting actuation of solenoid 104 causes the circuit to be closed through the contact 109 and the line 110 to signal light 86*e*, indicating that, for the moment, the minimum thickness of the board corresponds to the *e* segment in the assemblies. The actuation of solenoid 104, by closing contact 111 causes current from the main conductor 53, switch 3, line 88, line 89, line 112, and contact 111 to provide a holding circuit for solenoid 104. Also current passing through line 113 causes actuation of solenoid 114 which is connected by line 115, switch 107, line 108, switch 81, line 82 and line 83 with main conductor 52. Actuation of solenoid 114, by closing contact 116 of line 117 to color spray nozzle 69*e*, would cause spray nozzle 69*e* to operate except for the fact that the contacts 95 are open at switch 1.

Next let it be assumed that a thinner place along the board causes one or both of the conductor pointers to move up momentarily to the segment *d* from sement *e*. When the conductor pointer 37 or 38 contacts segment *d* in the respective assembly current passes over line 77 to one terminal of solenoid 78, the other terminal being connected through line 79, contact 80, switch element 81, line 82 and line 83 to main conductor 52. The resulting actuation of solenoid 78 causes a circuit to be closed through the contact 84 and line 85 to signal light 86*d*, indicating that, for the moment the minimum thickness of the board corresponds to the *d* segment in the assemblies. The actuation of solenoid 78, by closing contact 87, causes current from main conductor 53, switch 3, line 88, line 89, and contact 87 to provide a holding circuit for solenoid 78. In addition this opens contact 106 which breaks the circuit for solenoid 104 and solenoid 114. Also current passing through line 90 causes actuation of solenoid 90' which is connected by line 91, switch 81, line 82 and line 83 with main conductor 52. Actuation of solenoid 90', by closing contact 92 of line 93 to color spray nozzle 69*d*, would cause spray nozzle 69*d* to operate except for the fact that the contacts 95 are open at switch 1.

Now let it be assumed that a thinner place along the board causes one or both of the conductor pointers to move up momentarily to segment *c* from segment *d*. Current will now pass through line 96 to solenoid 97, the other terminal of solenoid 97 being connected to main conductor 52 through line 83. The resulting actuation of solenoid 97 causes contact 98 to be connected to line 88 thus providing a holding circuit for the solenoid. It also opens contact 80 which breaks the circuit for solenoid 78 and solenoid 90' and connects the contact 99 which energizes lamp 86*c*. Connecting the contact 98 also actuates solenoid 100 which would close the circuit to spray nozzle 69*c* except for the fact that contacts 95 are open. The solenoids 97 and 100 will now continue to be activated as long as neither conductor pointer reaches a higher segment. The registering of the conductor pointers with lower segments subsequently will not affect the solenoids 97 and 100. Finally when switch 1 is released by the board and the contacts 95 are closed, the spray nozzle 69*c* will discharge onto the board until the opening of switch 3 stops all further marking and clears the circuits of the device for the next board.

The switch 10 and switch 15 are foot-controlled switches that can be opened by the operator and are so arranged that the operator can have either or both or neither of the measuring assemblies function if he so desires. From line 73 switch 10 is in series with the line going to pointer 37 and switch 15 is in series with the line going to pointer 38. Therefore, opening either switch stops the gauging to the respective measuring assemblies. If both switches are opened neither side will gauge. The operator can control the gauging at any time while the board is passing through the device.

It will be noted also that measuring assembly 20 cannot function unless the contacts 59 are closed. Thus measuring assembly 20 will not function until switch 9 is operated by the proper positioning of the carriage 30 and assembly 20 with respect to the adjacent edge of the board passing through the device.

Various minor modifications in the structure and arrangement of portions of the device would be possible without departing from the principle of the invention, but the device when set up substantially as illustrated and described herein is regarded as the preferred means for carrying out the invention, and this particular device has proved very satisfactory in actual operation. However, it is not intended to limit the invention otherwise than as set forth in the claims.

I claim:

1. In a device for indicating the minimum thickness of a board passing through the device, a lower arm hinged on a base support to swing in a vertical plane, a shoe supported at one end of said arm, spring means urging said end of said arm and said shoe upwardly, an upper arm hinged on said lower arm to swing in the same vertical plane, a shoe mounted at one end of said upper arm in substantial vertical registration with said lower arm shoe, spring means connected with said upper arm urging said end of said upper arm and said upper shoe downwardly, means for moving a board along between said shoes, a plurality of separate electrical segments mounted on the upper end of one of said arms, a conductor pointer mounted on the other end of the other of said arms for movement over said electrical segments, and indicator means operated through the circuits completed by the contact of said conductor pointer with said segments separately for indicating the relative positions of said shoes and therewith the variations in thickness of said board.

2. In a device of the character described for indicating the thickness of a board passing through the device, a pair of similar thickness-measuring assemblies positioned along opposite sides of the path of the board, each of said assemblies having a lower and an upper shoe adapted to engage the lower and upper faces respectively of the board, resilient supporting means for said shoes in each assembly urging said lower shoe upwardly and said upper shoe downwardly, whereby said shoes, when contacted by said board, will constantly bear against the lower and upper faces of said board respectively, regardless of irregularities in said faces of said board, means for moving said board along between said shoes of said assemblies, means governed by the width of said board for automatically moving one of said assemblies towards or away from the other assembly to accommodate said device to boards of different widths, the shoes of said assemblies engaging the board near opposite edges of the board respectively, an electrically-operated indicating means connected with each assembly for indicating the spacing of the shoes in each assembly and thereby indicating the thickness of the portions of the board engaged by said assemblies.

3. The combination set forth in claim 2 with said means for moving one of said assemblies towards or away from the other assembly consisting of electrically-controlled means operated automatically by switches actuated by the board passing into said device.

4. In a device of the character described for indicating the thickness of a board passing through the device, a pair of similar thickness-measuring assemblies positioned along opposite sides of the path of the board, each assembly including a lower arm hinged on a base support to swing in a vertical plane substantially perpendicular to the direction of travel of the board, a shoe supported on the end of the arm extending in the path of the board, spring means urging said end of said arm and said shoe upwardly, an upper arm hinged on said lower arm to swing in the same plane, a shoe on one end of said upper arm in substantial vertical registration with the lower shoe, spring means urging said upper arm end and shoe downwardly, a plurality of separate electrical segments mounted at the other end of one arm, a conductor pointer on the other end of the other arm for movement over said electrical segments, said segments and said pointer of each assembly connected to electrically-operated indicating means for indicating the relative spacing between the shoes in each assembly, means for moving a board along between the shoes of said assemblies, and automatic means for moving one assembly towards or away from the other assembly to accommodate boards of different widths.

5. The combination set forth in claim 4 with the automatic means for moving one assembly towards or away from the other assembly including a movable carriage constituting the base support for one of said assemblies and movable towards or away from the base support of the other assembly, means for moving said carriage, electric control means for operating said carriage moving means, and switches in said electric control means automatically actuated by the board.

6. The combination set forth in claim 4 with said electrically-operated indicating means including a solenoid circuit connected with each of said segments and arranged to be closed by contact of said pointer with the segment, means for holding the circuit closed until the pointer moves to another segment corresponding to a reduced spacing between the shoes of the assembly, whereby the last circuit remaining closed when the board completes its travel through the device will represent the minimum board thickness encountered by the shoes of the assemblies, and board marking means actuated by said closed circuit when the board leaves the device.

7. A device for indicating the minimum thickness of the board passing through the device including a pair of similar thickness-measuring assemblies positioned along opposite sides of the path of the board, each assembly including a lower arm hinged on a base support to swing in a vertical plane substantially perpendicular to the direction of travel of the board, a shoe supported on the end of the arm extending in the path of the board, spring means urging said end of said arm and said shoe upwardly, an upper arm hinged on said lower arm to swing in the same plane, a shoe on one end of said upper arm in substantial vertical registration with the lower shoe, spring means urging said upper arm and shoe downwardly, a plurality of separate electrical segments mounted at the other end of one arm, a conductor pointer on the other end of the other arm for movement over the electrical segments, a solenoid circuit connected with each of said segments arranged to be closed by contact of said pointer with the segment, means for holding the circuit closed until the pointer moves to another segment corresponding to a reduced spacing between the shoes of the assembly, whereby the circuit remaining closed when the board completes its travel through the device will represent the minimum board thickness encountered by the shoes of the assembly, board marking means actuated by the closed circuit when the board leaves the device, the base support in one assembly being stationary and the base support in the other assembly consisting of a carriage movable towards or away from said stationary base support, means for moving said carriage, electric control means for operating said carriage moving means, switches in said electric control means automatically actuated by the board, means for moving the board along between the shoes of said assemblies and through said device, and manually-operable switch controls for discontinuing the indicating by either of said assemblies.

8. In a device for indicating the thickness of a board, a pair of arms positioned for rocking movement in the same vertical plane and arranged one above the other, a support for the lower arm, said lower arm rockably mounted on said support by hinge means located inwardly from the ends of said lower arm, the upper arm rockably supported on said lower arm by hinge means located inwardly from both ends of both arms, whereby said arms may rock with respect to each other and with respect to said support, a surface-engaging member mounted on one end of each arm, said members being in substantial registration with each other and adapted to bear against opposite faces of a board passing between said members, means for moving a board along between said members, resilient means exerting a force to move said last mentioned ends of said arms and therewith said members towards each other so as to hold said members constantly in contact with the opposite faces of said board while said board passes between said members, a plurality of separate electric conductor elements on the opposite end of one of said arms from said member on that arm, and an electric contact element on the corresponding opposite end of the other of said arms moving over said conductor elements.

References Cited in the file of this patent
UNITED STATES PATENTS

| 1,798,650 | Berlowitz | Mar. 31, 1931 |
| 2,587,774 | Shack et al. | Mar. 4, 1952 |

FOREIGN PATENTS

| 451,607 | Great Britain | Aug. 10, 1936 |